US011130703B2

(12) United States Patent
Jeong et al.

(10) Patent No.: US 11,130,703 B2
(45) Date of Patent: Sep. 28, 2021

(54) METHOD OF MANUFACTURING A BENDABLE SUBSTRATE COATED WITH A COATING LAYER OF ADJACENT HETEROGENEOUS COATINGS BONDED ALONG BOUNDARIES THEREOF USEFUL FOR FOLDABLE DISPLAYS

(71) Applicant: KOREA INSTITUTE OF INDUSTRIAL TECHNOLOGY, Cheonan-si (KR)

(72) Inventors: Yong Cheol Jeong, Hwaseong-si (KR); Kang Han Kim, Jinju-si (KR)

(73) Assignee: Korea Institute of Industrial Technology, Cheonan-si (KR)

( * ) Notice: Subject to any disclaimer, the term of this patent is extended or adjusted under 35 U.S.C. 154(b) by 0 days.

(21) Appl. No.: 16/498,098

(22) PCT Filed: Mar. 30, 2018

(86) PCT No.: PCT/KR2018/003782
§ 371 (c)(1),
(2) Date: Sep. 26, 2019

(87) PCT Pub. No.: WO2018/182359
PCT Pub. Date: Oct. 4, 2018

(65) Prior Publication Data
US 2020/0095161 A1  Mar. 26, 2020

(30) Foreign Application Priority Data

Mar. 30, 2017 (KR) ........................ 10-2017-0041126

(51) Int. Cl.
*C03C 17/00* (2006.01)
*C09D 183/06* (2006.01)
(Continued)

(52) U.S. Cl.
CPC .......... *C03C 17/007* (2013.01); *C09D 183/06* (2013.01); *C03C 2217/445* (2013.01);
(Continued)

(58) Field of Classification Search
CPC ........... C09D 183/06; B05D 1/26; B05D 1/34
See application file for complete search history.

(56) References Cited

U.S. PATENT DOCUMENTS 5,506,000 A * 4/1996 Leonard ................. B05C 5/008
427/402
5,700,325 A * 12/1997 Watanabe ............ B05C 5/0254
118/411
(Continued)

FOREIGN PATENT DOCUMENTS

KR         10-1288071 B1    7/2013
KR    10-2014-0066441 A    6/2014
(Continued)

*Primary Examiner* — Dah-Wei D. Yuan
*Assistant Examiner* — Kristen A Dagenais-Englehart
(74) *Attorney, Agent, or Firm* — Rabin & Berdo, P.C.

(57) ABSTRACT

Disclosed herein are a method of manufacturing a heterogeneous coating solution bonded coating layer, and a coating layer and a cover window produced thereby. More particularly, there are provided a method of manufacturing a heterogeneous coating solution bonded coating layer, in which a step difference at the boundary between different types of coating solutions is controllable by controlling a difference in capillary number during discharge of the different types of coating solutions using a slot die coater, and a coating layer and a cover window produced thereby. Therefore, the method of manufacturing a heterogeneous coating solution bonded coating layer can produce a cover window that is excellent in all the properties including durability, optical characteristics, and flexibility.

11 Claims, 10 Drawing Sheets

(52) U.S. Cl.
CPC .... *C03C 2217/475* (2013.01); *C03C 2217/48* (2013.01); *C03C 2217/78* (2013.01); *C03C 2218/11* (2013.01)

(56) References Cited

U.S. PATENT DOCUMENTS

| | | | |
|---|---|---|---|
| 2004/0265539 A1* | 12/2004 | Hashimoto | C08J 7/048 428/141 |
| 2013/0169515 A1 | 7/2013 | Prushinskiy et al. | |
| 2014/0145977 A1 | 5/2014 | Kang | |
| 2015/0305147 A1* | 10/2015 | Tombs | H05K 1/0296 345/174 |
| 2016/0014881 A1* | 1/2016 | Shin | G06F 1/1616 361/749 |
| 2016/0046830 A1* | 2/2016 | Kim | C08J 7/046 428/412 |

FOREIGN PATENT DOCUMENTS

| | | |
|---|---|---|
| KR | 10-2014-0076051 A | 6/2014 |
| KR | 10-2014-0104175 A | 8/2014 |
| KR | 10-2016-0006585 A | 1/2016 |
| KR | 20170006585 A * | 1/2017 |

\* cited by examiner

METHOD OF MANUFACTURING A BENDABLE SUBSTRATE COATED WITH A COATING LAYER OF ADJACENT HETEROGENEOUS COATINGS BONDED ALONG BOUNDARIES THEREOF USEFUL FOR FOLDABLE DISPLAYS

TECHNICAL FIELD

The present invention relates to a method of manufacturing a heterogeneous coating solution bonded coating layer, and a coating layer and a cover window produced thereby. More particularly, it relates to a method of manufacturing a heterogeneous coating solution bonded coating layer, in which a step difference at the boundary between different types of coating solutions is controlled by means of a slot die coater, and a coating layer and a cover window produced thereby.

BACKGROUND ART

With the development of IT industry, information terminals have led to an increasing trend of miniaturization or weight reduction while focusing on convenient mobility. However, as the amount of information increases, displays that transmit information through actual information terminals are required to be large rather than small in size. In order to meet both of these conflicting needs, foldable displays having both convenient portability and large screens may be presented as one solution. Indeed, the foldable displays are currently being applied in various display fields such as smart phones, tablet PCs, portable multimedia players (PMPs), navigation systems, e-books, and monitors.

These various displays commonly require a cover window (protective window) for user's touch while protecting the inside of each display at the outermost edge thereof. Therefore, the cover window is made of glass or rigid plastic that is transparent and has high strength and hardness. However, since the glass or rigid plastic may easily break when folded, it is difficult to actually apply it to the foldable displays. Accordingly, there has been proposed a hard coating film having high hardness and abrasion resistance to replace glass or rigid plastic.

Korean Patent Application Publication No. 10-2014-0104175 (hereinafter, referred to as "Prior Art 1") discloses a method of manufacturing a flexible hard coating film by polymerizing oligomeric siloxane containing an alicyclic epoxy group. Prior Art 1 is applicable to a curved display or the like by securing a certain degree of flexibility, but the degree of flexibility is insufficient for a foldable display.

The flexibility of the hard coating film must be excellent to improve the flexibility of the foldable display, and the hard coating layer must be thin to improve the flexibility of the hard coating film. However, since the hardness and strength of the hard coating film are reduced when the hard coating layer is thin, it is difficult to form the hard coating layer at a level suitable for use in the foldable display.

For this reason, in order to secure the hardness of the hard coating film at the level of glass, the hard coating layer in the hard coating film must be thick. As the thickness of the hard coating layer increases, the surface hardness thereof may be increased. However, since the hard coating layer is increasingly wrinkled or curled and, at the same time, is likely to be cracked (or split) or separated due to its shrinkage, it is not easy to apply the hard coating layer in practice.

Particularly, when it is intended to apply the hard coating film with high hardness to the foldable display, the hard coating film is contracted at its inner folded region by compression whereas it is stretched at its outer region by tension, resulting in more serious cracking in the folded region.

For this reason, a foldable display that is made of different types of materials and uses its folded portion as a flexible material layer for the physical connection of glass or rigid plastic has been studied. However, when the different types of materials are used, there is a problem with refractive visibility at the boundary between the materials due to the difference in refractive index therebetween.

Therefore, there is a need to develop a coating layer and a foldable display capable of satisfying all of flexibility, durability and refractive visibility, which are the properties required for the foldable display.

CITATION LIST

Patent Literature

[Patent Literature 1]
Korean Patent Application Publication No. 10-2014-0104175

SUMMARY OF INVENTION

Technical Problem

It is an object of the present invention to provide a method of manufacturing a heterogeneous coating solution bonded coating layer, in which a step difference at the boundary between different types of coating solutions is controllable by controlling a difference in capillary number during discharge of the different types of coating solutions using a slot die coater, and a coating layer and a cover window produced thereby.

The present invention is not limited to the above-mentioned object, and other objects of the present invention can be clearly understood by those skilled in the art to which the present invention pertains from the following description.

Solution to Problem

To accomplish the above object, in accordance with one aspect of the present invention, there is provided a method of manufacturing a heterogeneous coating solution bonded coating layer, which includes preparing a rigid coating solution and a flexible coating solution, simultaneously discharging the rigid coating solution and the flexible coating solution through respective outlets of a slot die coater, and coating the discharged rigid and flexible coating solutions on respective regions on a substrate to form a heterogeneous coating solution bonded coating layer, wherein in the simultaneously discharging the rigid coating solution and the flexible coating solution, a difference in capillary number between the rigid coating solution and the flexible coating solution is controlled.

In an embodiment of the present invention, the rigid coating solution may include 48 wt % to 94 wt % of organic flexible and inorganic rigid compounds, 1 wt % to 2 wt % of a photoinitiator, and 5 wt % to 50 wt % of a diluent, and the weight ratio of the organic flexible compound to the inorganic rigid compound may be 90:10 to 50:50.

In an embodiment of the present invention, the flexible coating solution may include 48 wt % to 94 wt % of organic flexible and inorganic rigid compounds, 1 wt % to 2 wt % of a photoinitiator, and 5 wt % to 50 wt % of a diluent, and the weight ratio of the organic flexible compound to the inorganic rigid compound is 100:0 to 60:40.

In an embodiment of the present invention, the organic flexible compound may include a photocurable resin or a thermosetting resin.

In an embodiment of the present invention, the inorganic rigid compound may include an epoxy-polyhedral oligomeric silsesquioxane (POSS) composite.

In an embodiment of the present invention, the photoinitiator may include at least one selected from the group of photoacid generators (PAGs) consisting of triphenylsulfonium triflate salt, triarylsulfonium hexafluorophosphate salt, diphenyliodonium nitrite salt, diphenyliodonium hexafluorophosphate salt, and triphenylsulfonium fluoro-1-butanesulfonate salt.

In an embodiment of the present invention, the diluent may include a hydrocarbon-based organic solvent, an alcohol-based organic solvent, an aldehyde-based organic solvent, a ketone-based organic solvent, an ether-based organic solvent, or an ester-based organic solvent.

In an embodiment of the present invention, the capillary number may be controlled by a coating solution flow rate, a coating solution viscosity, or a coating solution surface tension.

In an embodiment of the present invention, the difference in capillary number may be 10% or less.

In an embodiment of the present invention, the coating the discharged rigid and flexible coating solutions may include coating the discharged flexible coating solution on a first region, which is the center on the substrate, and coating the discharged rigid coating solution on second and third regions, which are the peripheries adjacent to both sides of the first region on the substrate.

In an embodiment of the present invention, a step difference at the boundary between the first region and the second region or between the first region and the third region may be controlled.

To accomplish the above object, in accordance with another aspect of the present invention, there is provided a heterogeneous coating solution bonded coating layer produced by the method of manufacturing a heterogeneous coating solution bonded coating layer.

To accomplish the above object, in accordance with a further aspect of the present invention, there is provided a cover window produced by the method of manufacturing a heterogeneous coating solution bonded coating layer.

In an embodiment of the present invention, the cover window may have a hardness of 0.15 GPa to 0.9 GPa.

In an embodiment of the present invention, the cover window may have a pencil hardness of 1 F to 4 H.

In an embodiment of the present invention, the cover window may have a stiffness of 1.0 GPa to 2.8 GPa.

In an embodiment of the present invention, the cover window may have a transmittance of 84% to 87% when it is irradiated with light of 550 nm.

In an embodiment of the present invention, no cracks may occur when the cover window is bent 50,000 times at a radius of curvature of 10 mm or less.

Advantageous Effects of Invention

As an effect of the present invention, it is possible to control a step difference at the boundary between different types of coating solutions by controlling a difference in capillary number during discharge of the different types of coating solutions through a method of manufacturing a heterogeneous coating solution bonded coating layer.

In addition, since a step difference on the heterogeneous coating solution bonded coating layer is controlled through the control of the step difference at the boundary, it is possible to improve refractive visibility at the boundary between the different types of coating solutions.

As another effect of the present invention, when a cover window is produced by the method of manufacturing a heterogeneous coating solution bonded coating layer, the flexibility of the cover window coated with a flexible coating solution and the durability of the cover window coated with a rigid coating solution, from among the different types of coating solutions, can be simultaneously improved.

The present invention is not limited to the above effects, and it should be understood that the present invention includes all effects which can be inferred from the detailed description of the present invention or the configuration of the invention defined by the appended claims.

DESCRIPTION OF EMBODIMENTS

Figure 1:
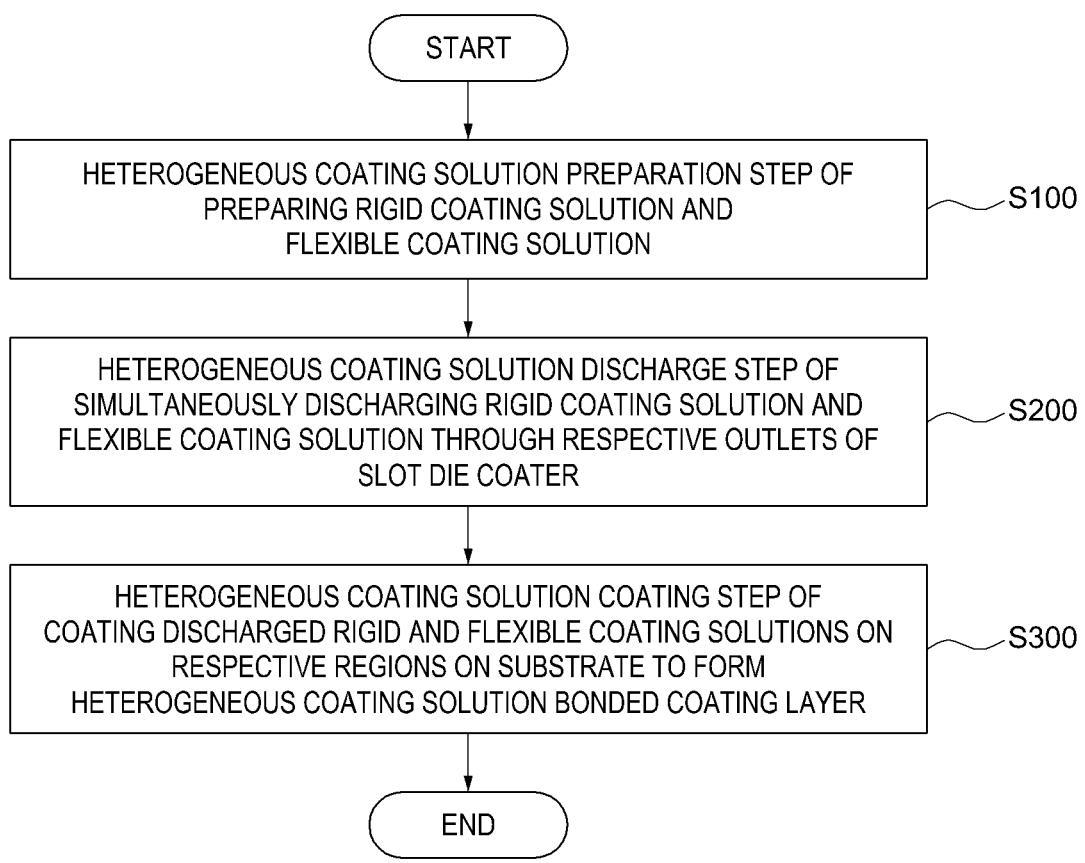
FIG. 1 is a flowchart illustrating a method of manufacturing a heterogeneous coating solution bonded coating layer according to an embodiment of the present invention.

Reference will now be made in detail to exemplary embodiments of the present invention, examples of which are illustrated in the accompanying drawings. The present invention may, however, be embodied in different forms and should not be construed as limited to the embodiments set forth herein. For a clear explanation of the present invention, parts irrelevant to the description may be omitted in the drawings, and like reference numerals refer to like parts throughout the specification.

In the whole specification, it will be understood that when an element is referred to as being "connected (joined, contacted, or coupled)" to another element, it can be "directly connected" to the other element or it can be "indirectly connected" to the other element with other elements being interposed therebetween. In addition, it will be understood that when a component is referred to as "comprising or including" any component, it does not exclude other components, but can further comprise or include the other components unless otherwise specified.

The terminology used in the present disclosure is for the purpose of describing particular embodiments only and is not intended to limit the invention. As used in the disclosure and the appended claims, the singular forms "a", "an" and "the" are intended to include the plural forms as well, unless context clearly indicates otherwise. It will be further understood that the terms "comprises/includes" and/or "comprising/including" when used in this specification, specify the presence of stated features, integers, steps, operations, elements, components, and/or groups thereof, but do not preclude the presence or addition of one or more other features, integers, steps, operations, elements, components, and/or groups thereof.

Exemplary embodiments of the present invention will be described below in detail with reference to the accompanying drawings.

Hereinafter, a method of manufacturing a heterogeneous coating solution bonded coating layer will be described.

FIG. 1 is a flowchart illustrating a method of manufacturing a heterogeneous coating solution bonded coating layer according to an embodiment of the present invention. Referring to FIG. 1, the method of manufacturing a heterogeneous coating solution bonded coating layer according to the present invention may include a heterogeneous coating solution preparation step of preparing a rigid coating solution and a flexible coating solution (S100), a heterogeneous coating solution discharge step of simultaneously discharging the rigid coating solution and the flexible coating solution through respective outlets of a slot die coater (S200), and a heterogeneous coating solution coating step of coating the discharged rigid and flexible coating solutions on respective regions on a substrate to form a heterogeneous coating solution bonded coating layer (S300).

First, in the heterogeneous coating solution preparation step of preparing a rigid coating solution and a flexible coating solution (S100), the coating solutions are different types of coating solutions and may be a rigid coating solution having rigid properties and a flexible coating solution having flexible properties in the present invention.

In an embodiment of the present invention, the rigid coating solution may include 48 wt % to 94 wt % of organic flexible and inorganic rigid compounds, 1 wt % to 2 wt % of a photoinitiator, and 5 wt % to 50 wt % of a diluent.

The inorganic rigid compound is a component for exhibiting rigid properties as a main property of the rigid coating solution, and specifically may be an epoxy-polyhedral oligomeric silsesquioxane (POSS) composite.

The epoxy-POSS composite is a composite obtained by bonding an epoxy group to POSS, which is an inorganic silica compound having an organic substituent, and is known to exhibit various intermediate properties of polymeric materials and ceramics. Therefore, the epoxy-POSS composite can innovatively improve the required performance by mixing an epoxy compound with POSS through copolymerization or blending due to chemical properties with little or no change of existing mass production processes.

The organic flexible compound may be composed of a photocurable resin or a thermosetting resin for curing the rigid coating solution. Specifically, the photocurable resin or thermosetting resin may be a phenol resin or an epoxy resin, but is not limited thereto.

For example, the organic flexible compound may include 1,4-butanediol diglycidyl ether (BDGE).

In an embodiment of the present invention, the weight ratio of the organic flexible compound to the inorganic rigid compound may be 90:10 to 50:50. If the amount of the inorganic rigid compound is less than 10 wt % based on the total weight of the compound, it is difficult to exhibit the rigid properties of the rigid coating solution. If the amount of the inorganic rigid compound is more than 50 wt % based on the total weight of the compound, it is not preferable since, due to an excess amount of inorganic rigid compound, the reaction rate is lowered and the curing is not progressed when the heterogeneous coating solution bonded coating layer is produced later.

In an embodiment of the present invention, the amount of the organic flexible and inorganic rigid compounds is a remaining amount excluding the amount of the photoinitiator and the diluent, which will be described later, based on the total weight of the rigid coating solution, and the amount of the organic flexible and inorganic rigid compounds is preferably 48 wt % to 94 wt %.

The photoinitiator in the rigid coating solution of the present invention functions to induce polymerization by absorbing ultraviolet rays or thermal energy to generate free radicals or cations in an ultraviolet or thermal curing process in the heterogeneous coating solution coating step S300 to be described later. The photoinitiator may include at least one selected from the group of photoacid generators (PAGs) consisting of triphenylsulfonium triflate salt, triarylsulfonium hexafluorophosphate salt, diphenyliodonium nitrite salt, diphenyliodonium hexafluorophosphate salt, and triphenylsulfonium fluoro-1-butanesulfonate salt, but the present invention is not limited thereto.

For example, the photoinitiator in the rigid coating solution of the present invention may be IRGACURE PAG 103, IRGACURE PAG 121, IRGACURE PAG 203, IRGACURE PAG 290, IRGACURE 250, CGI 725, CGI1907, or GSID26-1.

The amount of the photoinitiator in the rigid coating solution of the present invention may be 1 wt % to 2 wt %. If the amount of the photoinitiator is less than 1 wt %, it is difficult to exhibit sufficient hardness due to slow reaction. If the amount of the photoinitiator is more than 2 wt %, it is not preferable since the color of the heterogeneous coating solution bonded coating layer to be produced later is changed and the transparency thereof is lowered.

The diluent in the rigid coating solution of the present invention may be used as a solvent for controlling the viscosity of the rigid coating solution in the process of mixing the organic flexible compound, the inorganic rigid compound, and the photoinitiator to produce the rigid coating solution. Besides, the diluent may enhance adhesion, reactivity, chemical resistance, and wear resistance, and impart functions such as antistatic properties to the heterogeneous coating solution bonded coating layer to be produced later. The diluent may be a solvent in a form of an organic solvent, and specifically may be a hydrocarbon-based organic solvent, an alcohol-based organic solvent, an aldehyde-based organic solvent, a ketone-based organic solvent, an ether-based organic solvent, or an ester-based organic solvent. More preferably, methyl ethyl ketone (MEK) or acetone, which has a low boiling point and somewhat low toxicity, may be suitable for the diluent.

For example, the diluent in the rigid coating solution of the present invention may be methyl ethyl ketone, acetone, isopropyl alcohol, toluene, ethyl ether, or ethyl acetate.

Preferably, the amount of the diluent in the rigid coating solution of the present invention is 5 wt % to 50 wt %. If the amount of the diluent is less than 5 wt %, it is not preferable since the viscosity of the rigid coating solution is excessively increased and the smoothness of the heterogeneous coating solution bonded coating layer to be produced later is lowered. If the amount of the diluent is more than 50 wt %, it is not preferable since the hardness of the coating layer is decreased.

In an embodiment of the present invention, the flexible coating solution may include 48 wt % to 94 wt % of organic flexible and inorganic rigid compounds, 1 wt % to 2 wt % of a photoinitiator, and 5 wt % to 50 wt % of a diluent.

The organic flexible compound is a main component of the flexible coating solution for exhibiting flexible properties as a main property of the flexible coating solution, and may be composed of a photocurable resin or a thermosetting resin for curing the heterogeneous coating solution bonded coating layer to be produced later. Specifically, the photocurable resin or thermosetting resin may be a phenol resin or an epoxy resin, but is not limited thereto.

For example, the organic flexible compound may include 1,4-butanediol diglycidyl ether (BDGE).

In addition, the inorganic rigid compound may be a material that improves dispersion of the organic flexible compound, and the inorganic rigid compound may include an epoxy-polyhedral oligomeric silsesquioxane (POSS) composite.

In an embodiment of the present invention, the weight ratio of the organic flexible compound to the inorganic rigid compound may be 100:0 to 60:40. The inorganic rigid compound may be excluded from the flexible coating solution, as long as the organic flexible compound can be sufficiently dispersed in the flexible coating solution even when the inorganic rigid compound is excluded therefrom. If the amount of the organic flexible compound is less than 60 wt % based on the total weight of the compound, it is not preferable as it is difficult to exhibit the flexible properties of the flexible coating solution.

In an embodiment of the present invention, the amount of the organic flexible and inorganic rigid compounds is a remaining amount excluding the amount of the photoinitiator and the diluent, which will be described later, based on the total weight of the flexible coating solution, and the amount of the organic flexible and inorganic rigid compounds is preferably 48 wt % to 94 wt %.

The photoinitiator in the flexible coating solution of the present invention functions to induce polymerization by absorbing ultraviolet rays or thermal energy to generate cations in an ultraviolet or thermal curing process in the heterogeneous coating solution coating step S300 to be described later. The photoinitiator may include at least one selected from the group of photoacid generators (PAGs) consisting of triphenylsulfonium triflate salt, triarylsulfonium hexafluorophosphate salt, diphenyliodonium nitrite salt, diphenyliodonium hexafluorophosphate salt, and triphenylsulfonium fluoro-1-butanesulfonate salt, but the present invention is not limited thereto.

For example, the photoinitiator in the flexible coating solution of the present invention may be IRGACURE PAG 103, IRGACURE PAG 121, IRGACURE PAG 203, IRGACURE PAG 290, IRGACURE 250, CGI 725, CGI1907, or GSID26-1.

The amount of the photoinitiator in the flexible coating solution of the present invention may be 1 wt % to 2 wt %. If the amount of the photoinitiator is less than 1 wt %, it is difficult to exhibit sufficient hardness due to slow reaction. If the amount of the photoinitiator is more than 2 wt %, it is not preferable since the color of the heterogeneous coating solution bonded coating layer to be produced later is changed and the transparency thereof is lowered.

The diluent in the flexible coating solution of the present invention may be used as a solvent for controlling the viscosity of the flexible coating solution in the process of mixing the organic flexible compound, the inorganic rigid compound, and the photoinitiator to produce the flexible coating solution. Besides, the diluent may enhance adhesion, reactivity, chemical resistance, and wear resistance, and impart functions such as antistatic properties to the heterogeneous coating solution bonded coating layer to be produced later. The diluent may be a solvent in a form of an organic solvent, and specifically may be a hydrocarbon-based organic solvent, an alcohol-based organic solvent, an aldehyde-based organic solvent, a ketone-based organic solvent, an ether-based organic solvent, or an ester-based organic solvent. More preferably, methyl ethyl ketone (MEK) or acetone, which has a low boiling point and somewhat low toxicity, may be suitable for the diluent.

For example, the diluent in the flexible coating solution of the present invention may be methyl ethyl ketone, acetone, isopropyl alcohol, toluene, ethyl ether, or ethyl acetate.

Preferably, the amount of the diluent in the flexible coating solution of the present invention is 5 wt % to 50 wt %. If the amount of the diluent is less than 5 wt %, it is not preferable since the viscosity of the flexible coating solution is excessively increased and the smoothness of the heterogeneous coating solution bonded coating layer to be produced later is lowered. If the amount of the diluent is more than 50 wt %, it is not preferable since the hardness of the coating layer is decreased.

Next, in the heterogeneous coating solution discharge step of simultaneously discharging the rigid coating solution and the flexible coating solution through respective outlets of a slot die coater (S200), the difference in capillary number between the rigid coating solution and the flexible coating solution can be controlled.

Slot die coating is a coating method of uniformly applying flowable coating solutions supplied between machined molds by flowing in a slot die by a non-pulsating pump or a piston pump, which may be used for the method of manufacturing a heterogeneous coating solution bonded coating layer in the present invention.

When the different types of coating solutions are simultaneously discharged using the slot die coater, due to the difference in coating solution properties, a different discharge behavior occur at the boundary between the different types of coating solutions and thus a step difference occur at the boundary. Hence, it may be difficult to control the coating layer that is intended to be produced to a uniform thickness.

Accordingly, the difference in capillary number between the rigid coating solution and the flexible coating solution is controlled to control the discharge behavior between the different types of coating solutions in the present invention. The capillary number may be defined by the following Equation 1:

$$C_a = \frac{\mu V}{\sigma} \qquad \text{[Equation 1]}$$

where $C_a$ is the capillary number, $\mu$ is the viscosity of the coating solution, V is the flow rate of the coating solution, and $\sigma$ is the surface tension of the coating solution.

According to Equation 1, the capillary number may be controlled by the flow rate of the coating solution, the viscosity of the coating solution, or the surface tension of the coating solution, and the discharge behavior when the rigid and flexible coating solutions are discharged from the slot die coater may be defined in proportion to the capillary number. Therefore, the smaller the difference in capillary number between the rigid coating solution and the flexible coating solution, the smaller the difference in discharge behavior when the rigid and flexible coating solutions are discharged from the slot die coater, thereby enabling the step difference between the rigid coating solution and the flexible coating solution to be controlled.

In an embodiment of the present invention, the difference in capillary number may be 10% or less, more preferably 5% or less. If the difference in capillary number between the rigid coating solution and the flexible coating solution is more than 5%, it is not preferable since a step difference may occur at the boundary between the rigid coating solution and the flexible coating solution.

Finally, in the heterogeneous coating solution coating step of coating the discharged rigid and flexible coating solutions on respective regions on a substrate to form a heterogeneous coating solution bonded coating layer (S300), the step difference on the heterogeneous coating solution bonded coating layer due to the rigid and flexible coating solutions discharged from the slot die coater can be controlled by controlling the difference in capillary number.

In an embodiment of the present invention, the substrate may be made of glass, tempered glass, polyethyleneterephthalate (PET), polycarbonate (PC), polymethyl methacrylate (PMMA), polyethylene naphthalate (PEN), or polyethersulfone (PES), but is not limited thereto.

In an embodiment of the present invention, the heterogeneous coating solution coating step S300 may include a step of coating the discharged flexible coating solution on a first region, which is the center on the substrate, and coating the discharged rigid coating solution on second and third regions, which are the peripheries adjacent to both sides of the first region on the substrate.

Figure 2:
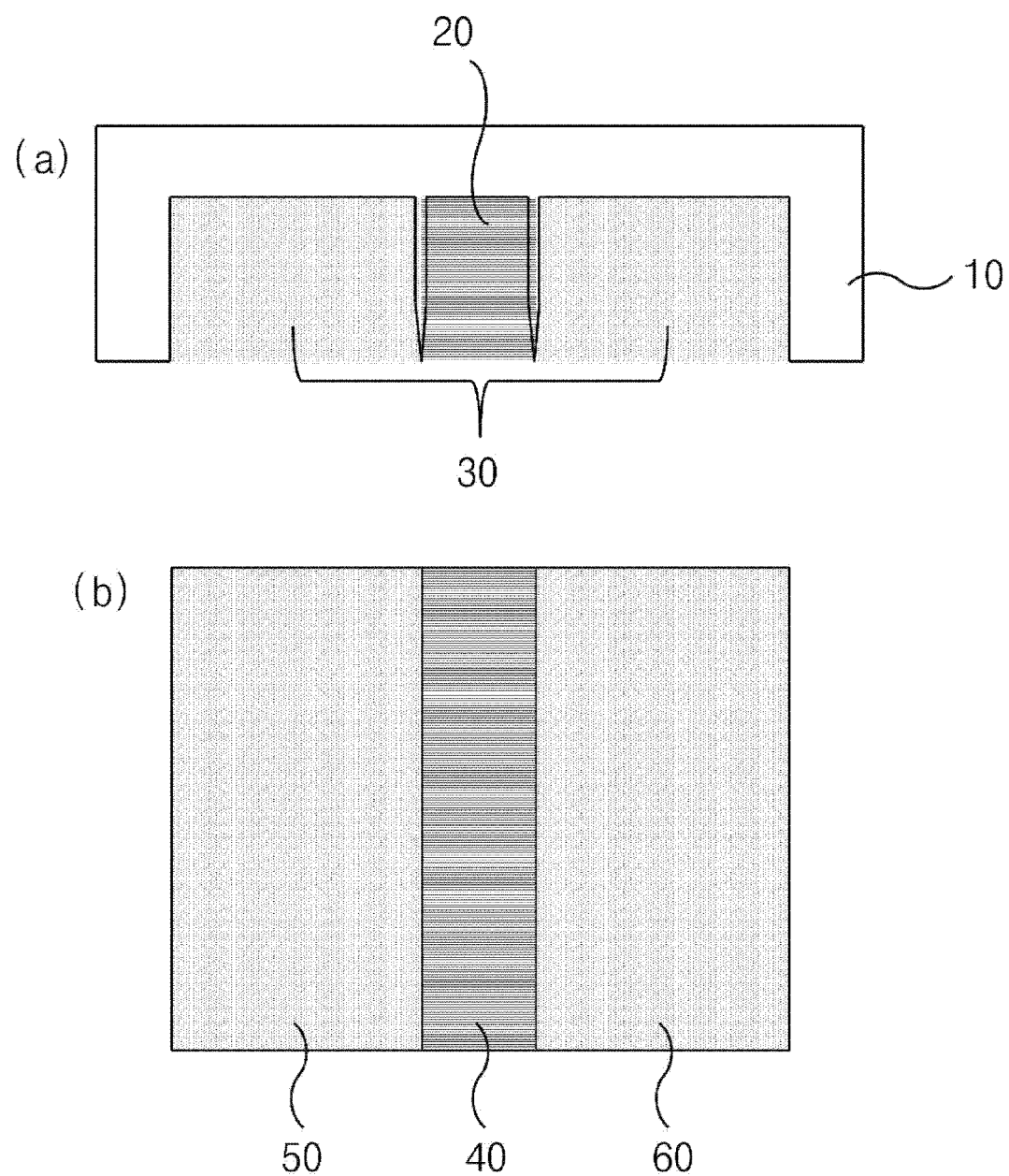
FIG. 2 is a cross-sectional view of a slot die coater nozzle (FIG. 2(a)) and a top view of a heterogeneous coating solution bonded coating layer (FIG. 2(b)) according to an embodiment of the present invention.

FIG. 2 is a cross-sectional view of a slot die coater nozzle (FIG. 2(a)) and a top view of a heterogeneous coating solution bonded coating layer (FIG. 2(b)) according to an embodiment of the present invention. Referring to FIG. 2(a), the slot die coater nozzle, which is designated by reference numeral 10, may be configured such that its flexible coating solution region 20 and rigid coating solution regions 30 are separated from each other to discharge respective flexible and rigid coating solutions. In this case, the flexible coating solution region 20 may be positioned at the center of the slot die coater nozzle 10, and the rigid coating solution regions 30 may be positioned at the peripheries adjacent to both sides of the center of the nozzle. Thus, referring to FIG. 2(b), the different types of coating solutions discharged from the nozzle 10 may be simultaneously coated on a substrate, similar to the flexible coating solution region 20 and the rigid coating solution regions 30 of the nozzle 10. On the basis of the above-mentioned flexible and rigid coating solution regions 20 and 30, the discharged flexible coating solution may be coated on a first region 40 which is the center on the substrate, and the discharged rigid coating solution may be coated on a second region 50 and a third region 60 which are the peripheries adjacent to both sides of the first region 40 on the substrate.

Figure 3:
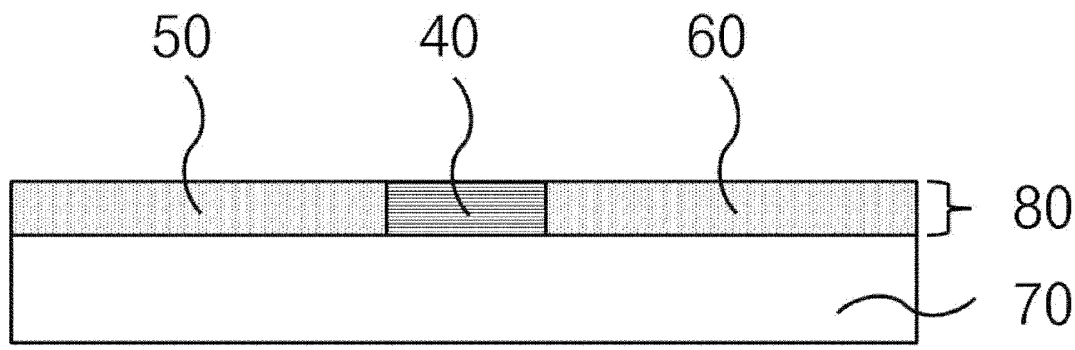
FIG. 3 is a cross-sectional view of a heterogeneous coating solution bonded coating layer according to an embodiment of the present invention.

FIG. 3 is a cross-sectional view of a heterogeneous coating solution bonded coating layer according to an embodiment of the present invention. Referring to FIG. 3, the heterogeneous coating solution bonded coating layer, which is designated by reference numeral 80, may be formed on a substrate 70 such that the step difference at the boundary between a first region 40 coated with a flexible coating solution and a second region 50 coated with a rigid coating solution or at the boundary between the first region 40 and a third region 60 coated with the rigid coating solution is controlled.

Hereinafter, a heterogeneous coating solution bonded coating layer produced by the method of manufacturing a heterogeneous coating solution bonded coating layer will be described.

The heterogeneous coating solution bonded coating layer is a coating layer formed by simultaneously coating rigid and flexible coating solutions on respective regions using a slot die coater, and the coated rigid coating solution region and flexible coating solution region may be bonded at the boundary therebetween. In this case, the step difference at the boundary can be controlled by controlling the discharge behavior between the rigid coating solution and the flexible coating solution due to coating solution properties when the rigid and flexible coating solutions are discharged from the slot die coater, and the coating solution properties may be a difference in capillary number.

The discharge behavior when the rigid and flexible coating solutions are discharged from the slot die coater may be defined in proportion to the capillary number. Therefore, the smaller the difference in capillary number between the rigid coating solution and the flexible coating solution, the smaller the difference in discharge behavior when the rigid and flexible coating solutions are discharged from the slot die coater, thereby enabling the step difference at the boundary therebetween to be controlled.

Hereinafter, a cover window produced by the method of manufacturing a heterogeneous coating solution bonded coating layer will be described.

The cover window is a protective window for protecting the inside of a foldable display. The cover window must have excellent flexibility at its folded portion since it should be transparent and excellent in durability and be foldable.

The cover window of the present invention may have a hardness of 0.15 GPa to 0.9 GPa, a stiffness of 1.0 GPa to 2.8 GPa, and a pencil hardness of 1 F to 4 H, as illustrated in Experimental Examples 2 to 4 which will be described later. Therefore, the cover window is excellent in durability.

In addition, the cover window of the present invention has a transmittance of about 84% to 87% when the cover window is irradiated with light of 550 nm, as illustrated in Experimental Example 5 which will be described later. Therefore, the transmittance of the cover window can be maintained while its durability is enhanced.

In addition, the cover window of the present invention is excellent in flexibility since no cracks occur when the cover window is bent 50,000 times at a radius of curvature of 10 mm or less, and particularly no cracks occur even when the cover window is bent 50,000 times at a radius of curvature of 3 mm, as illustrated in Experimental Example 6 which will be described later.

Hereinafter, production examples and experimental examples of the present invention will be described. However, these production examples and experimental examples are intended to explain the configuration and effect of the present invention in more detail, and the scope of the present invention is not limited thereto.

Production Example 1

Production of Cover Window

A rigid coating solution is prepared that includes 2 wt % of triarylsulfonium hexafluorophosphate salt, 5 wt % of methyl ethyl ketone, and a balance of 1,4-butanediol diglycidyl ether and epoxy-POSS in a weight ratio of 90:10. A flexible coating solution is prepared that includes 2 wt % of triarylsulfonium hexafluorophosphate salt, 5 wt % of methyl ethyl ketone, and a balance of 1,4-butanediol diglycidyl ether. The rigid and flexible coating solutions are injected into respective outlets of a slot die coater. The rigid and flexible coating solutions are discharged at a rate of 20 mm per second and simultaneously coated to a thickness of 50 µm on a polyethyleneterephthalate film having a thickness of 100 µm by operating the slot die coater at a coating rate of 15 mm per second. Then, a cover window is produced by exposing the coated film to a metal halide UV lamp (120 mW/cm$^2$) for 15 minutes for photocuring to form a heterogeneous coating solution bonded coating layer.

Production Example 2

A cover window is produced in the same manner as in Production Example 1, except that the methyl ethyl ketone content of the flexible coating solution is 6 wt %.

Production Example 3

A cover window is produced in the same manner as in Production Example 1, except that the methyl ethyl ketone content of the flexible coating solution is 7 wt %.

Production Example 4

A cover window is produced in the same manner as in Production Example 1, except that the methyl ethyl ketone content of the flexible coating solution is 8 wt %.

Production Example 5

A cover window is produced in the same manner as in Production Example 1, except that the methyl ethyl ketone content of the flexible coating solution is 9 wt %.

Production Example 6

A cover window is produced in the same manner as in Production Example 1, except that the methyl ethyl ketone content of the flexible coating solution is 10 wt %.

Production Example 7

Production of Cover Window

A rigid coating solution is prepared that includes 2 wt % of triarylsulfonium hexafluorophosphate salt, 25 wt % of methyl ethyl ketone, and a balance of 1,4-butanediol diglycidyl ether and epoxy-POSS in a weight ratio of 70:30. A flexible coating solution is prepared that includes 2 wt % of triarylsulfonium hexafluorophosphate salt, 20 wt % of methyl ethyl ketone, and a balance of 1,4-butanediol diglycidyl ether and epoxy-POSS in a weight ratio of 80:20. The rigid and flexible coating solutions are injected into respective outlets of a slot die coater. The rigid and flexible coating solutions are discharged at a rate of 20 mm per second and simultaneously coated to a thickness of 50 µm on a polyethyleneterephthalate film having a thickness of 100 µm by operating the slot die coater at a coating rate of 15 mm per second. Then, a cover window is produced by exposing the coated film to a metal halide UV lamp (120 mW/cm$^2$) for 15 minutes for photocuring to form a heterogeneous coating solution bonded coating layer.

Production Example 8

A cover window is produced in the same manner as in Production Example 7, except that the methyl ethyl ketone content of the flexible coating solution is 21 wt %.

Production Example 9

A cover window is produced in the same manner as in Production Example 7, except that the methyl ethyl ketone content of the flexible coating solution is 22 wt %.

Production Example 10

A cover window is produced in the same manner as in Production Example 7, except that the methyl ethyl ketone content of the flexible coating solution is 23 wt %.

Production Example 11

A cover window is produced in the same manner as in Production Example 7, except that the methyl ethyl ketone content of the flexible coating solution is 24 wt %.

Production Example 12

A cover window is produced in the same manner as in Production Example 7, except that the methyl ethyl ketone content of the flexible coating solution is 25 wt %.

Production Example 13

Production of Cover Window

A rigid coating solution is prepared that includes 2 wt % of triarylsulfonium hexafluorophosphate salt, 50 wt % of methyl ethyl ketone, and a balance of 1,4-butanediol diglycidyl ether and epoxy-POSS in a weight ratio of 50:50. A flexible coating solution is prepared that includes 2 wt % of triarylsulfonium hexafluorophosphate salt, 45 wt % of methyl ethyl ketone, and a balance of 1,4-butanediol diglycidyl ether and epoxy-POSS in a weight ratio of 60:40. The rigid and flexible coating solutions are injected into respective outlets of a slot die coater. The rigid and flexible coating solutions are discharged at a rate of 20 mm per second and simultaneously coated to a thickness of 50 µm on a polyethyleneterephthalate film having a thickness of 100 µm by operating the slot die coater at a coating rate of 15 mm per second. Then, a cover window is produced by exposing the coated film to a metal halide UV lamp (120 mW/cm$^2$) for 15 minutes for photocuring to form a heterogeneous coating solution bonded coating layer.

Production Example 14

A cover window is produced in the same manner as in Production Example 13, except that the methyl ethyl ketone content of the flexible coating solution is 46 wt %.

Production Example 15

A cover window is produced in the same manner as in Production Example 13, except that the methyl ethyl ketone content of the flexible coating solution is 47 wt %.

Production Example 16

A cover window is produced in the same manner as in Production Example 13, except that the methyl ethyl ketone content of the flexible coating solution is 48 wt %.

Production Example 17

A cover window is produced in the same manner as in Production Example 13, except that the methyl ethyl ketone content of the flexible coating solution is 49 wt %.

Production Example 18

A cover window is produced in the same manner as in Production Example 13, except that the methyl ethyl ketone content of the flexible coating solution is 50 wt %.

Experimental Example 1

Analysis of Step Difference on Heterogeneous Coating Solution Bonded Coating Layer in Relation to Difference in Capillary Number Between Rigid Coating Solution and Flexible Coating Solution In order to analyze the step difference on the heterogeneous coating solution bonded coating layer in relation to the difference in capillary number between rigid and flexible coating solutions at the time of discharging the rigid and flexible coating solutions from the slot die coater, the capillary number of each of the rigid and flexible coating solutions used in Production Examples 1 to 18 is calculated from the coating solution viscosity value and the coating solution surface tension value measured by the viscometer and the surface tension meter, and the coating solution discharge flow rate in the coater. The step differences on the heterogeneous coating solution bonded coating layers in Production Examples 1 to 18 are measured at a distance of 5 mm using the micrometer.

Figure 4:
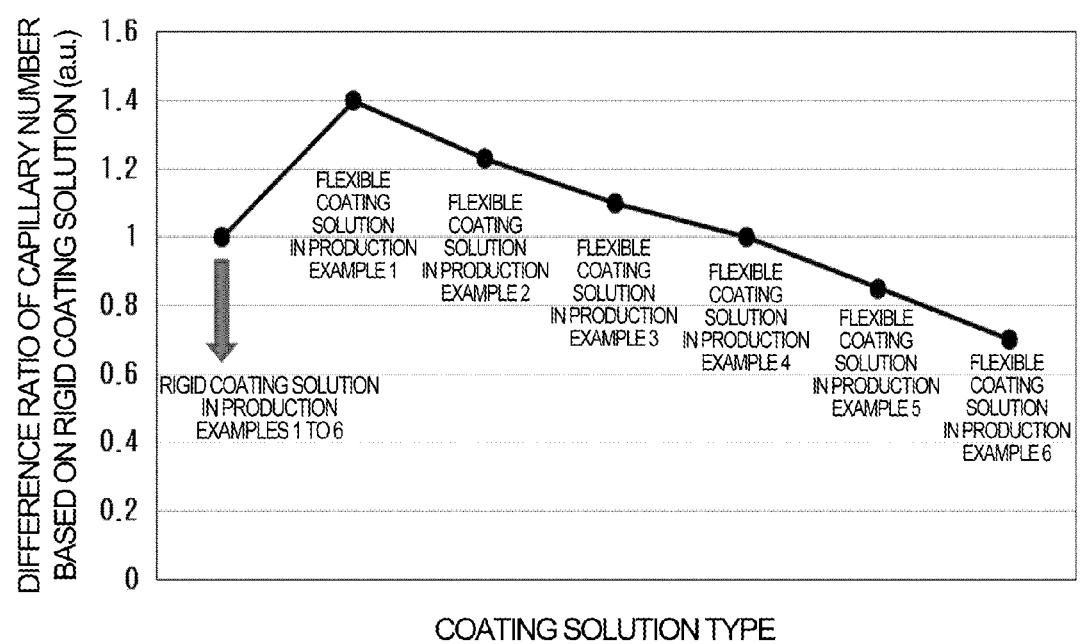
FIG. 4 is a graph illustrating a difference in capillary number between rigid and flexible coating solutions in Production Examples 1 to 6 according to an embodiment of the present invention.

FIG. 4 is a graph illustrating a difference in capillary number between rigid and flexible coating solutions in Production Examples 1 to 6 according to an embodiment of the present invention. Referring to FIG. 4, on the basis that the capillary number of the rigid coating solution at the time of discharge from the slot die coater in each of Production Examples 1 to 6 is 1, the difference in capillary number between the flexible coating solution at the time of discharge from the slot die coater in Production Example 4 and the above rigid coating solution is smallest, in which case it is seen that the difference in capillary number is 0.01 or less and barely exists. Accordingly, it can be determined that the difference in capillary number between the rigid coating solution and the flexible coating solution at the time of discharge from the slot die coater is controlled by controlling the viscosity of the flexible coating solution by the diluent content of the flexible coating solution.

Figure 5:
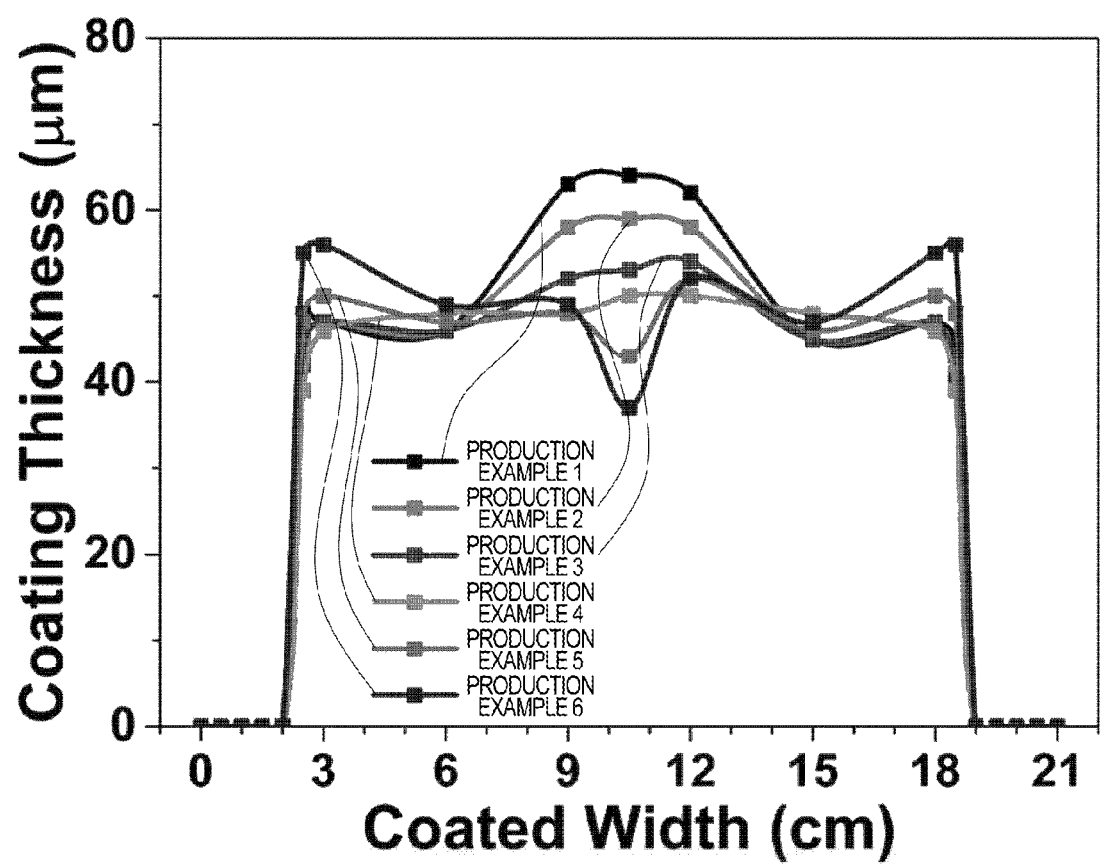
FIG. 5 is a graph illustrating a step difference on the heterogeneous coating solution bonded coating layer in Production Examples 1 to 6 according to an embodiment of the present invention.

FIG. 5 is a graph illustrating a step difference on the heterogeneous coating solution bonded coating layer in Production Examples 1 to 6 according to an embodiment of the present invention. Referring to FIG. 5, it is confirmed that the step difference at the boundary between the rigid coating solution coating region and the flexible coating solution coating region bonded to each other on the heterogeneous coating solution bonded coating layer in Production Example 4 is the smallest.

Figure 6:
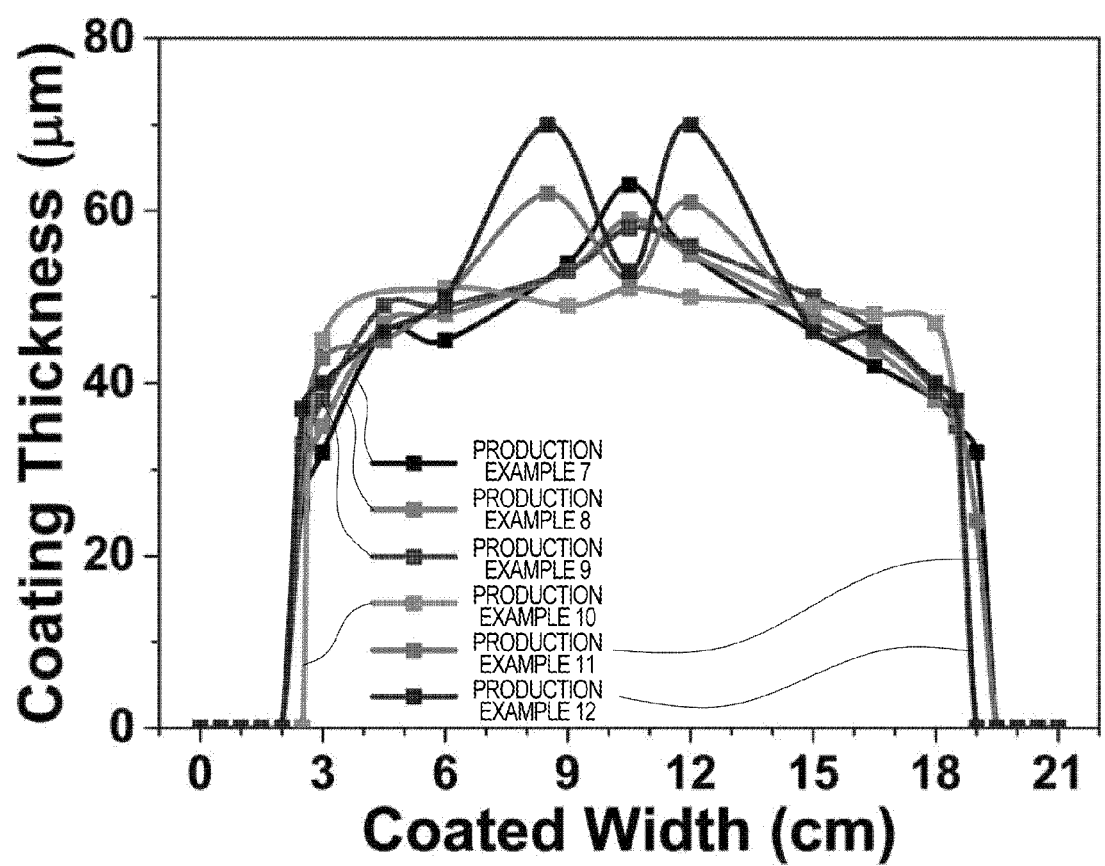
FIG. 6 is a graph illustrating a step difference on the heterogeneous coating solution bonded coating layer in Production Examples 7 to 12 according to an embodiment of the present invention.
Figure 7:
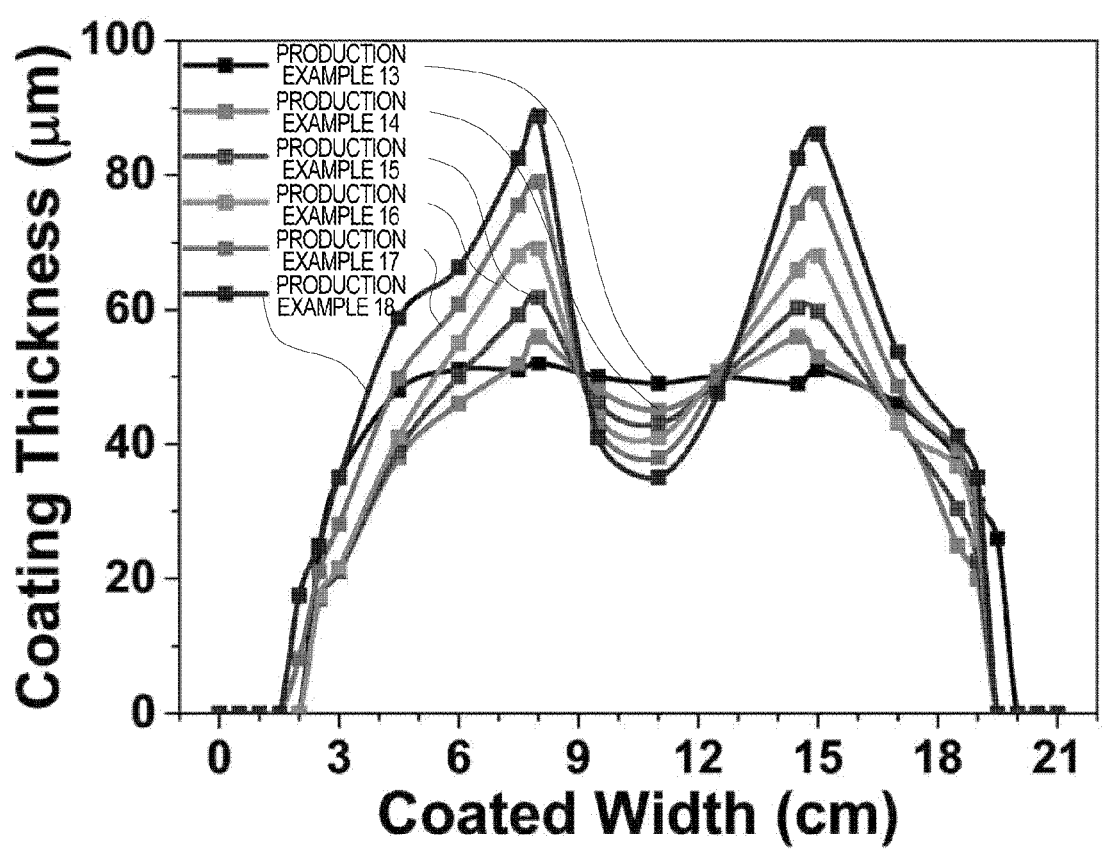
FIG. 7 is a graph illustrating a step difference on the heterogeneous coating solution bonded coating layer in Production Examples 13 to 18 according to an embodiment of the present invention.

Based on these results, it can be determined that when the cover window coated with the heterogeneous coating solution bonded coating layer is produced, the smaller the difference in capillary number between the rigid coating solution and the flexible coating solution at the time of discharge from the slot die coater, the smaller the step difference at the boundary between the rigid coating solution coating region and the flexible coating solution coating region on the heterogeneous coating solution bonded coating layer. In addition, it can be determined that the refractive visibility of the cover window is improved by virtue of the reduction of the step difference at the boundary. Furthermore, it can be determined that the durability of the rigid coating solution coating region and the flexibility of the flexible coating solution coating region in the cover window are improved at the same time by virtue of the reduction of the step difference at the boundary. Based on the above description, the meanings of the graphs of FIGS. 6 to 7 can be described in the same manner as in FIG. 5.

Experimental Example 2

Analysis of Hardness of Cover Window in Relation to Inorganic Rigid Compound Content of Rigid Coating Solution In order to analyze the hardness of the cover window in relation to the inorganic rigid compound content of the rigid coating solution, the hardness of the cover window in each of Production Examples 4, 10, and 13 is analyzed using the nanoindentation measurement mode of the atomic force microscope (AFM).

Figure 8:
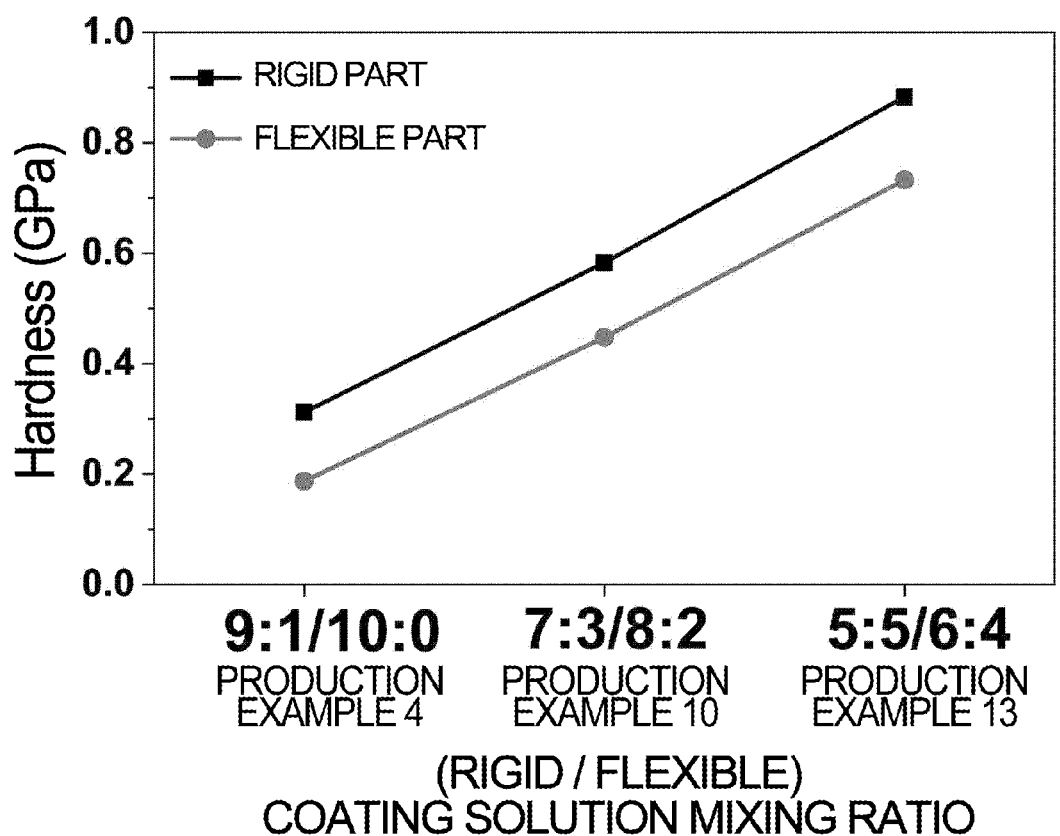
FIG. 8 is a graph illustrating hardness in Production Examples 4, 10, and 13 according to an embodiment of the present invention.

FIG. 8 is a graph illustrating hardness in Production Examples 4, 10, and 13 according to an embodiment of the present invention. Referring to FIG. 8, when comparing the hardnesses of the cover windows in Production Examples 4, 10, and 13 in which the step difference on the heterogeneous coating solution bonded coating layer of each cover window is controlled, it is seen that the hardness value increases as the inorganic rigid compound content of the rigid coating solution increases. Accordingly, it can be determined that the durability of the cover window increases as the ratio of the inorganic rigid compound content of the rigid coating solution constituting the non-folded portion in the cover window increases.

Experimental Example 3

Analysis of Stiffness of Cover Window in Relation to Inorganic Rigid Compound Content of Rigid Coating Solution In order to analyze the stiffness of the cover window in relation to the inorganic rigid compound content of the rigid coating solution, the stiffness of the cover window in each of Production Examples 4, 10, and 13 is analyzed using the nanoindentation measurement mode of the atomic force microscope (AFM).

Figure 9:
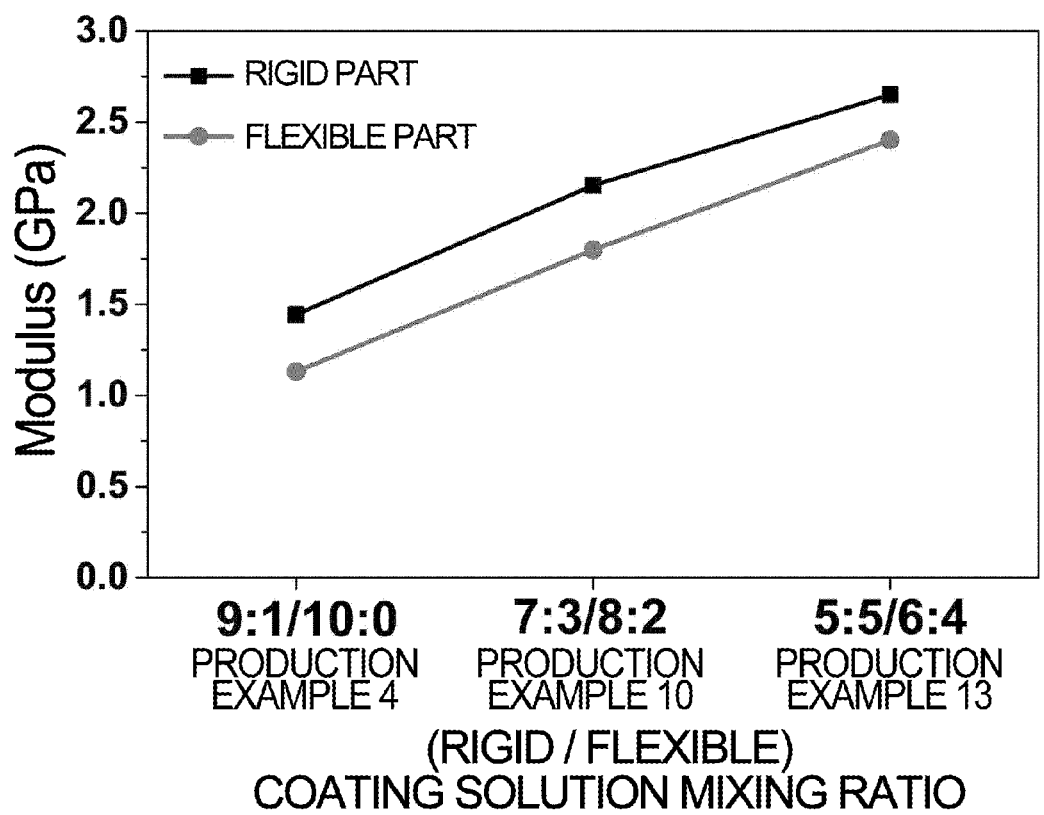
FIG. 9 is a graph illustrating stiffness in Production Examples 4, 10, and 13 according to an embodiment of the present invention.

FIG. 9 is a graph illustrating stiffness in Production Examples 4, 10, and 13 according to an embodiment of the present invention. Referring to FIG. 9, when comparing the stiffnesses of the cover windows in Production Examples 4, 10, and 13 in which the step difference on the heterogeneous coating solution bonded coating layer of each cover window is controlled, it is seen that the stiffness value increases as the inorganic rigid compound content of the rigid coating solution increases. Accordingly, it can be determined that the durability of the cover window increases as the ratio of the inorganic rigid compound content of the rigid coating solution constituting the non-folded portion in the cover window increases.

Experimental Example 4

Analysis of Pencil Hardness of Cover Window in Relation to Inorganic Rigid Compound Content of Rigid Coating Solution In order to analyze the pencil hardness of the cover window in relation to the inorganic rigid compound content of the rigid coating solution, the pencil hardness of the cover window in each of Production Examples 4, 10, and 13 is marked with hardness when the cover window is evaluated five times and then not scratched four times or more by pencils having hardness of their own after each pencil is fixed in a direction of 45° under a load of 500 g and the coating film is fixed on the glass such that the coating surface is directed toward the pencil.

Figure 10:
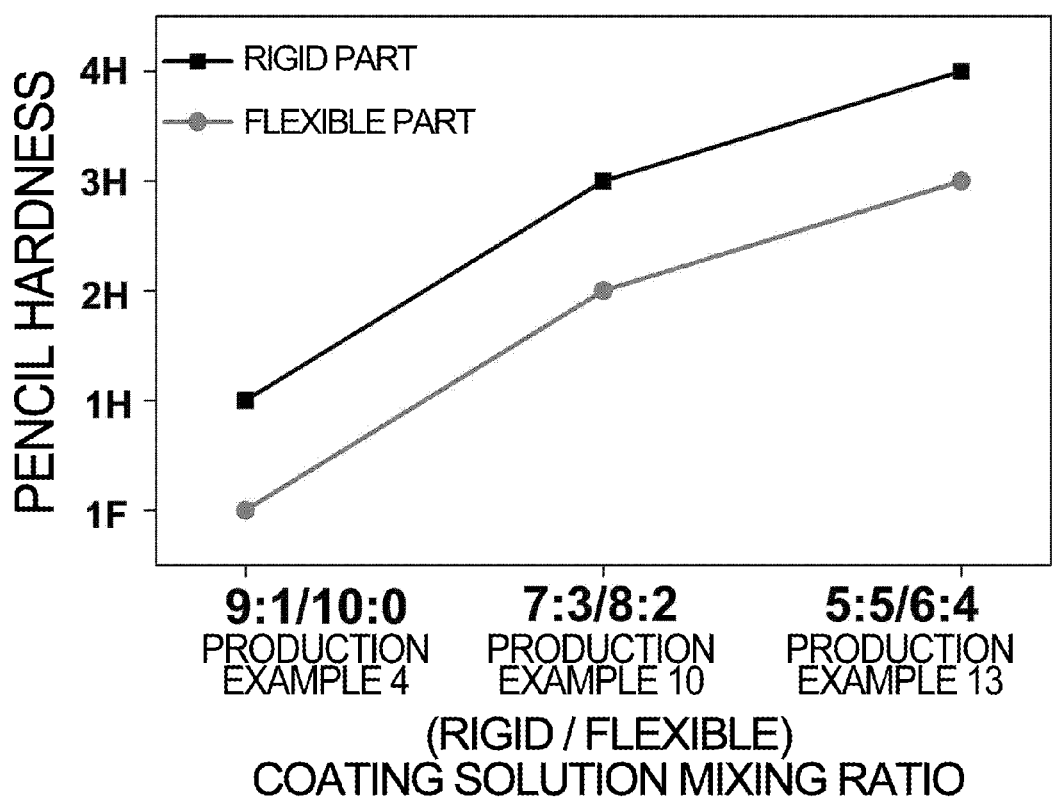
FIG. 10 is a graph illustrating pencil hardness in Production Examples 4, 10, and 13 according to an embodiment of the present invention.

FIG. 10 is a graph illustrating pencil hardness in Production Examples 4, 10, and 13 according to an embodiment of the present invention. Referring to FIG. 10, when comparing the pencil hardnesses of the cover windows in Production Examples 4, 10, and 13 in which the step difference on the heterogeneous coating solution bonded coating layer of each cover window is controlled, it is seen that the pencil hardness value increases as the inorganic rigid compound content of the rigid coating solution increases. Accordingly, it can be determined that the durability of the cover window increases as the ratio of the inorganic rigid compound content of the rigid coating solution constituting the non-folded portion in the cover window increases.

Experimental Example 5

Analysis of Transmittance of Cover Window in Relation to Inorganic Rigid Compound Content of Rigid Coating Solution In order to analyze the transmittance of the cover window in relation to the inorganic rigid compound content of the rigid coating solution, the transmittance of the cover window in a wavelength band of 405 nm or 550 nm in each of Production Examples 4, 10, and 13 is analyzed from the transmission spectrum through the UV spectrometer.

Figure 11:
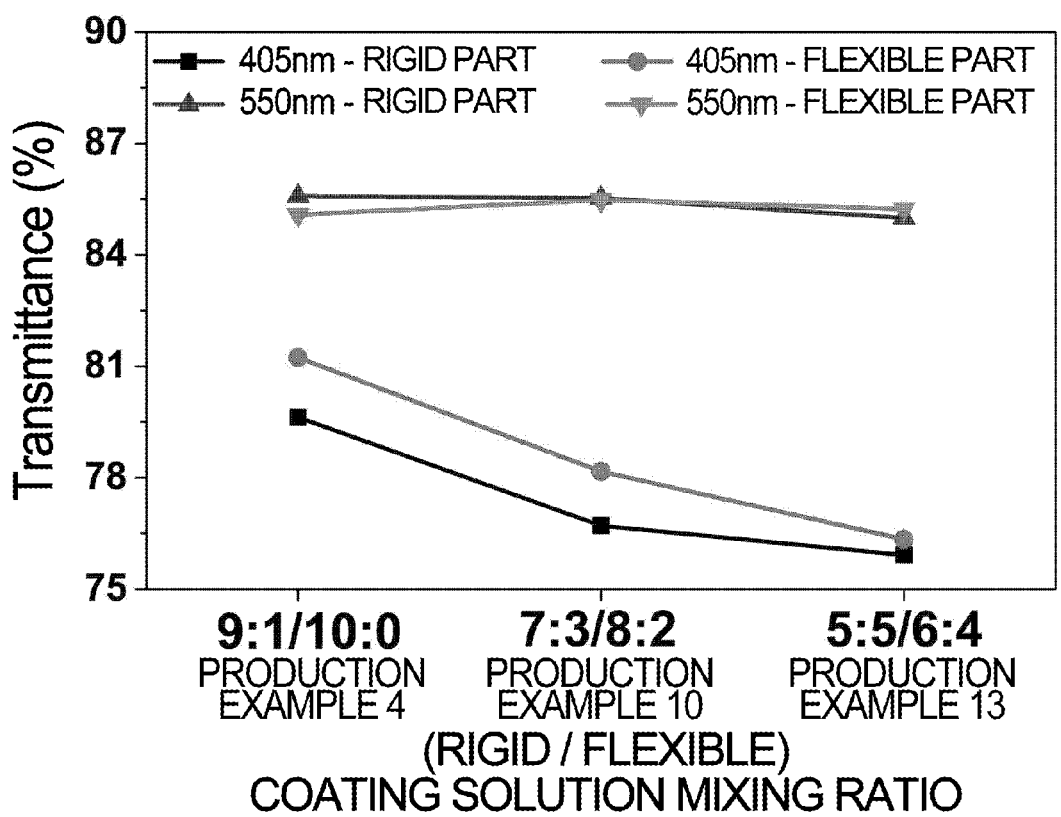
FIG. 11 is a graph illustrating transmittance at the time of irradiation with light of 405 nm or 550 nm in Production Examples 4, 10, and 13 according to an embodiment of the present invention.

FIG. 11 is a graph illustrating transmittance in Production Examples 4, 10, and 13 according to an embodiment of the present invention. Referring to FIG. 11, when comparing the transmittances of the cover windows in Production Examples 4, 10, and 13 in which the step difference on the heterogeneous coating solution bonded coating layer of each cover window is controlled, it is seen that the transmittance of the cover window at the time of irradiation with light of 405 nm tends to somewhat decrease as the inorganic rigid compound content of the rigid coating solution increases. However, it is seen that the transmittance of the cover window at the time of irradiation with light of 555 nm is maintained at 84% to 87% even though the inorganic rigid compound content of the rigid coating solution increases. Accordingly, it can be determined that the cover window having both excellent durability and optical characteristics can be manufactured since the optical characteristics of the cover window are not deteriorated even though the inorganic rigid compound content of the rigid coating solution increases to improve the durability of the cover window.

Experimental Example 6

Analysis of Flexibility of Cover Window in Relation to Inorganic Rigid Compound Content of Rigid Coating Solution In order to analyze the flexibility of the cover window in relation to the inorganic rigid compound content of the rigid coating solution, after the radius of curvature of the cover window in each of Production Examples 4, 10, and 13 is set to 10 mm, 5 mm, or 3 mm, the cover window is repeatedly folded in half 50,000 times. The result is illustrated in the following Table 1.

TABLE 1

| Radius of Curvature | Number of Repetitions | Production Example 4 | Production Example 10 | Production Example 13 |
|---|---|---|---|---|
| 10 mm | 50,000 | No Cracks | No Cracks | No Cracks |
| 5 mm | 50,000 | No Cracks | No Cracks | No Cracks |
| 3 mm | 50,000 | No Cracks | No Cracks | No Cracks |

Referring to Table 1, when each cover window is repeatedly folded in half 50,000 times, it is seen that no cracks occur at the cover windows irrespective of all radii of curvature thereof in Production Examples 4, 10, and 13.

Accordingly, in the cover window produced by the method of manufacturing a heterogeneous coating solution bonded coating layer according to the present invention, it can be determined that the smaller the difference in capillary number between the rigid coating solution and the flexible coating solution at the time of discharge from the slot die coater, the smaller the step difference at the boundary between the rigid coating solution and the flexible coating solution on the heterogeneous coating solution bonded coating layer. In addition, the method of manufacturing a heterogeneous coating solution bonded coating layer according to the present invention can be suitable to produce the cover window exhibiting excellent physical properties since the durability of the cover window increases but the optical characteristics and flexibility thereof are not deteriorated as the inorganic rigid compound content of the rigid coating solution increases.

The above-mentioned embodiments of the present invention are merely examples, and it will be understood by those skilled in the art that various modifications may be made without departing from the spirit and scope or essential features of the invention. Therefore, it should be understood that the embodiments described above are for purposes of illustration only in all aspects and are not intended to limit the scope of the present invention. For example, each component described in a single form may be implemented in a distributed form, and similarly, components described in the distributed form may be implemented in a combined form.

The scope of the present invention is defined by the appended claims, and it should be construed that all modifications or variations derived from the meaning, scope, and equivalent concept of the claims fall within the scope of the invention.

REFERENCE SIGNS LIST

10: slot die coater nozzle
20: flexible coating solution region of slot die coater nozzle
30: rigid coating solution region of slot die coater nozzle
40: first region
50: second region
60: third region
70: substrate
80: heterogeneous coating solution bonded coating layer

What is claimed is:

1. A method of manufacturing a substrate which is a coated substrate that is bendable and that includes heterogeneous coatings disposed side-by-side on the substrate adjacent to one another that are bonded to one another along respective boundaries thereof, the method comprising:
providing a substrate that is bendable;
preparing a rigid coating solution and a flexible coating solution including respective diluents, having respective capillary numbers, and having a controlled difference in capillary numbers of 10% or less;
simultaneously discharging the rigid coating solution and the flexible coating solution through respective outlets of a slot die coater to coat the discharged rigid coating solution and the discharged flexible coating solution onto respective adjacent regions of the substrate to form at least one rigid coating and at least one flexible coating; and
curing to form said heterogeneous coatings that are disposed side-by-side on the substrate and that are bonded to one another along respective boundaries thereof to facilitate crack-free bendability of the coated substrate,
wherein the controlled difference in capillary numbers of 10% or less provides respective coating thicknesses having minimal step differences between the heterogeneous coatings.

2. The method according to claim 1, wherein the rigid coating solution comprises:
from 48 wt % to 94 wt % of an organic flexible compound and an inorganic rigid compound present in a weight ratio of the organic flexible compound to the inorganic rigid compound ranging from 90:10 to 50:50;
from 1 wt % to 2 wt % of a photoinitiator; and
from 5 wt % to 50 wt % of a diluent.

3. The method according to claim 1, wherein the flexible coating solution comprises:
from 48 wt % to 94 wt % of an organic flexible compound and an inorganic rigid compound present in a weight ratio of the organic flexible compound to the inorganic rigid compound ranging from 100:0 to 60:40;
from 1 wt % to 2 wt % of a photoinitiator; and
from 5 wt % to 50 wt % of a diluent.

4. The method according to claim 2 or 3, wherein the organic flexible compound comprises a photocurable resin or a thermosetting resin.

5. The method according to claim 2 or 3, wherein the inorganic rigid compound comprises an epoxy-polyhedral oligomeric silsesquioxane (POSS) composite.

6. The method according to claim 2 or 3, wherein the photoinitiator comprises a photoacid generator (PAG) selected from the group consisting of a triphenylsulfonium triflate salt, a triarylsulfonium hexafluorophosphate salt, a diphenyliodonium nitrite salt, a diphenyliodonium hexafluorophosphate salt, a triphenylsulfonium fluoro-1-butanesulfonate salt, and combinations thereof.

7. The method according to claim 2 or 3, wherein the respective diluents comprise a hydrocarbon-based organic solvent, an alcohol-based organic solvent, an aldehyde-based organic solvent, a ketone-based organic solvent, an ether-based organic solvent, or an ester-based organic solvent.

8. The method according to claim 1, wherein the rigid coating solution and the flexible coating solution each have a capillary number which is defined by Equation 1 below:

$$C_a = \frac{\mu V}{\sigma}, \qquad \text{Equation 1}$$

where $C_a$ is the capillary number of a coating solution, $\mu$ is viscosity of the coating solution, $V$ is flow rate of the coating solution, and $\sigma$ is surface tension of the coating solution, and
wherein the capillary number of the coating solution is controlled by varying the flow rate, or the viscosity, or the surface tension or combinations thereof.

9. The method according to claim 1, wherein coating the discharged rigid coating solution and the discharged flexible coating solution comprises:
coating the discharged flexible coating solution on a first region, which is a center portion of the substrate; and
coating the discharged rigid coating solution on a second region and on a third region, which are respective peripheries adjacent to both sides of the first region of the substrate.

10. The method according to claim 9, wherein the step difference at the boundary between the first region and the second region or between the first region and the third region is controlled.

11. A method of manufacturing a substrate which is a coated substrate that is bendable and that includes heterogeneous coatings disposed on the substrate adjacent to one another that are bonded to one another along respective boundaries thereof, the method comprising:
providing a substrate that is bendable;
preparing a rigid coating solution comprised of an inorganic rigid compound comprising an epoxy-polyhedral oligomeric silsesquioxane (POSS) composite, and a diluent; and a flexible coating solution comprised of an organic flexible compound comprising a photocurable resin and a photoinitiator or a thermosetting resin, and a diluent;
controlling a difference in capillary numbers between the rigid coating solution and the flexible coating solution to 5% or less;
simultaneously discharging the rigid coating solution and the flexible coating solution through respective outlets of a slot die coater to coat the discharged rigid coating solution and the discharged flexible coating solution onto respective adjacent regions of the substrate to form at least one rigid coating and at least one flexible coating; and
curing the at least one rigid coating and the at least one flexible coating to remove respective diluents and either thermoset the thermosetting resin or irradiate the photocurable resin of the flexible coating to provide said heterogeneous coatings that are bonded to one another along respective boundaries thereof to facilitate crack-free bendability of the coated substrate,
wherein the difference in capillary numbers of 5% or less provides respective coating thicknesses having minimal step differences between the heterogeneous coatings.

* * * * *